March 18, 1952  P. J. CARPENTIER  2,589,537
METHOD OF GENERATING GASES WITHIN PLASTIC MATERIALS
Filed Sept. 7, 1949  2 SHEETS—SHEET 1

Inventor:
PASCAL J. CARPENTIER
By: Attorney

March 18, 1952     P. J. CARPENTIER     2,589,537
METHOD OF GENERATING GASES WITHIN PLASTIC MATERIALS
Filed Sept. 7, 1949     2 SHEETS—SHEET 2
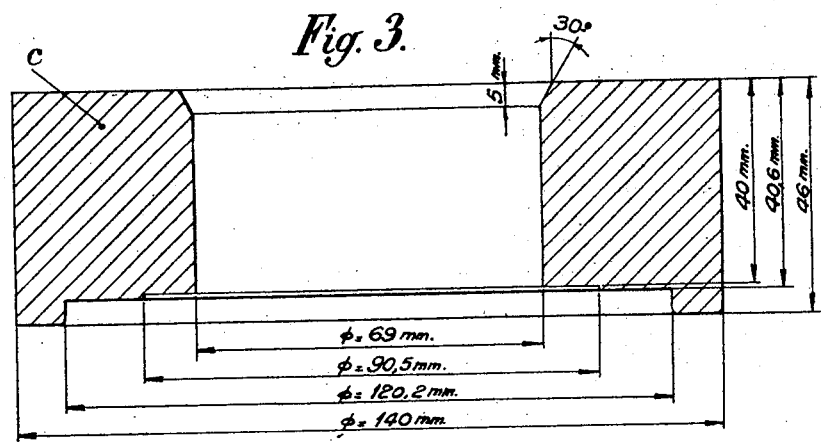
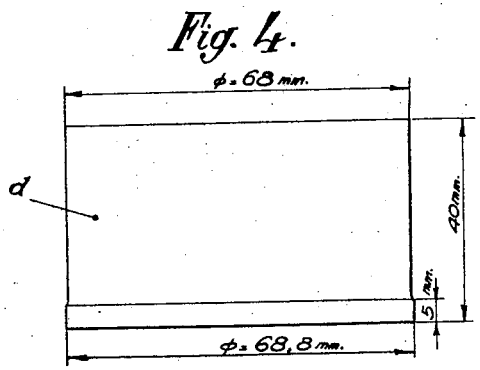
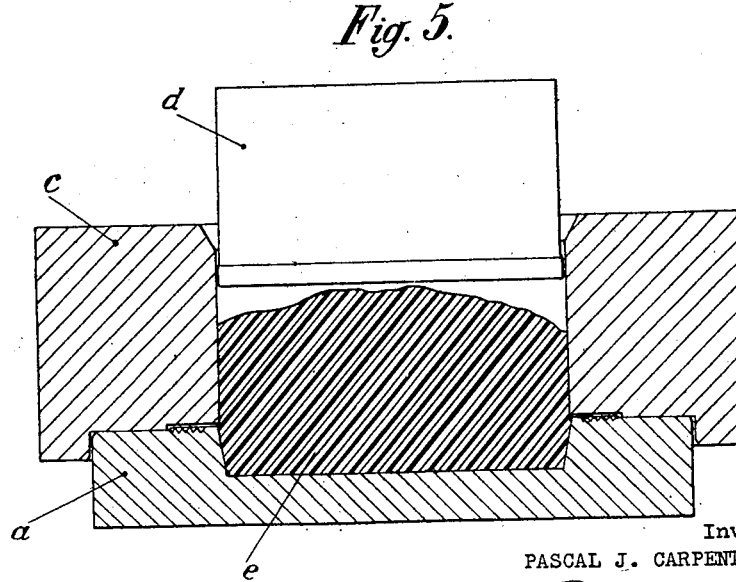
Inventor:
PASCAL J. CARPENTIER
By: Attorney Patented Mar. 18, 1952

2,589,537

UNITED STATES PATENT OFFICE 2,589,537

METHOD OF GENERATING GASES WITHIN PLASTIC MATERIALS

Pascal J. Carpentier, Paris, France

Application September 7, 1949, Serial No. 114,397
In France September 10, 1948

2 Claims. (Cl. 260—2.5)

This invention relates to improvements in methods of forming gas-expanded cellular materials, and in particular to methods of increasing the volume and hence reducing the specific gravity of closed-cell gas-expanded materials.

Several methods are known for the production of materials having a cellular structure and in which the various cells, which are distributed in considerable numbers throughout the material and which are more or less uniform in size, are individually closed, i. e. have no communication with one another. The said cells are filled with air or with gases or a liquid.

One of the characteristic steps in the production of such materials is the expansion of a gas more or less finely and uniformly distributed in a material, combined with a swelling of the latter consequent to the formation of cells, or to the enlargement of preexisting cells, the material then being obtained preferably in a suitable plastic state or is brought to such a condition.

According to some methods, gas is introduced for that purpose from the outside into the material.

According to other methods, the gas is generated within the material with the aid of substances admixed therein, which substances will evolve gas under known conditions, as by heating to a comparatively high temperature, or by reaction with added ingredients.

My invention relates to a method by which gases are generated within materials of the kind in question, especially for the purpose of swelling said materials. It is characterized by the fact that agents such as water vapor or oxygen are introduced into the materials by means of which organic acids are generated within the latter by reacting with organic anhydrides, ketones, aldehydes, or like acid-generating substances already present therein, which acids in turn react with carbonates or peroxides also present to liberate gases.

The initial materials may contain several acid anhydrides, carbonates and peroxides, and several agents may be introduced from the outside, so that several reactions may be generated to produce acids and gases. Where peroxides are admixed and water is introduced, a reaction may take place between the two substances which is attended with the evolution of oxygen which will assist the swelling process, this being a desirable result; however, the oxygen will react with an aldehyde in the material to produce an acid which in turn reacts with a carbonate and/or peroxide, and result in the evolution of gas. For the purpose of the invention, it is immaterial that the reactions take place quantitatively or not, or that secondary reactions occur or not.

Normally, the two characteristic ingredients in the process, i. e. the organic acid generators and the carbonates and peroxides in the mix, are mixed ready for use. The fact that they may be modified subsequently by partaking of reactions that have nothing to do with the invention, e. g. polymerizations, copolymerizations, and so on, has no importance provided the molecule still contains one of the groups characteristic of and necessary in the reactions according to the invention.

From the viewpoint of the mechanical properties of the material obtained, it may be advisable to use higher-polymeric substances, for instance a higher polymer that contains the anhydrid group:

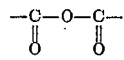

further higher polymers being present or not in the material. The preparation, molding and swelling steps may be facilitated by the use of liquid or low-melting substances, or of substances capable in combination with other constituents of the mix of creating such properties. On the other hand, and as a rule, the ingredients according to the invention may be so chosen that they will not only perform the functions assigned thereto according to my invention but also produce a complemental, e. g. plasticizing effect.

A particular advantage of this method resides in that reactions of two different kinds are initiated successively. Those of the first kind, i. e. the acid-generating reactions, result from the introduction of substances from the outside, for the purpose of which the penetration of said substances can advantageously be facilitated and accelerated by the use of pressure. Likewise, such a use can subsequently stop or delay the gas-generating reactions, i. e. those of the second kind, to which the swelling effect is assigned. It may be useful this time, in order to assist the evolution of the gas and the swelling action, to work under a vacuum. The reactions of either kind may be carried out at comparatively high temperatures, although those of the second kind frequently require higher temperatures, e. g. of the order of 100° C., in order to make the material sufficiently plastic where it is desired to swell it to a maximum. In each particular case the technician should decide whether there is any advantage in providing for a lag between the two kinds of reactions.

An advantageous application of my methods is the one in which by well known means and while starting from natural and synthetic products admixed according to my invention on the one hand with organic acid generators and on the other hand with carbonates and/or peroxides, materials having a cellular structure are prepared which contain the said substances or derivatives thereof in the molecule of which at least one characteristic group is present. By the method according to my invention, gas is evolved in the said materials by which the cells are expanded and consequently the material itself swelled.

For instance, cellular materials of that kind are manufactured by the method according to the French Patent No. 940,847 from mixtures containing higher-polymeric polyvinyl chloride to which a gas-generating ingredient, for instance an organic acid anhydride, e. g. maleic acid anhydride, and such a carbonate as calcium carbonate are admixed according to my invention.

The cellular material obtained by the methods just mentioned is kept for about one hour in a steam-saturated atmosphere at a temperature of about 80° C. under a pressure of about 1 kg./sq. cm. and then for about half an hour at about 100° C. under normal pressure or even under a vacuum of about 0.2 kg./sq. cm. After cooling it is found that the cellular material has swelled.

It may be advisable to combine the practical performance of the method with the carrying out of other steps from which a heating effect, or the introduction of agents, is additionally awaited.

*Example 1.*—27 grs. of tricresyl phosphate are mixed with 25 grs. of maleic acid anhydride and heated to melting temperature. 15 grs. of natural calcium carbonate are stirred into the melt. To the resulting mixture there are added 73 grs. of polyvinyl chloride of the kind marketed by the Company Rhone Poulenc, Paris, France, under the trade name "Rhodopas X," and 10 grs. of azo-isobutyric acid dinitrile and the whole is converted into an extremely fine and homogeneous powder.

A round mold such as illustrated in Figs. 1–5 of the appended drawing is filled with 55 grs. of the said powder.

In filling the mold *a* same is capped with the steel sleeve shown in vertical section in Fig. 3, the 55 grs. of powder are poured thereinto, after which the piston shown in elevational view in Fig. 4 is inserted. The position of the whole is then as shown in Fig. 5 in which *a*, *c* and *e* designate vertical views respectively of the mold proper, the sleeve and the charge, while *d* designates the piston shown in elevational view.

The whole is laid in a press by means of which the charge is forced into the mold to a disc in which practially no air is enclosed any more. The piston and the sleeve are then removed and the cover *b* laid on the mold that contains the 55 grs. of briquetted mix. The mold capped with its cover is then laid between the plates of a hydraulic press and a pressure of 23.5 tons applied. The plates of the press are then heated in such a manner that the temperature of the mixture is raised to 170° C. within 5 minutes. The said temperature is then maintained for 5 minutes, following which the plates are cooled so that the temperature of the charge is sunk to normal, i. e. about 20° C The press is opened and so is the mold, which thereafter is stripped from the solid blank The latter thereafter is heated for 20 minutes, preferably in a stove, in a well agitated air at a temperature of 115° C. This treatment results in a pre-swelling of the solid blank, whereby a cellular blank is obtained which is allowed to rest for 24 hours.

Figure 1:
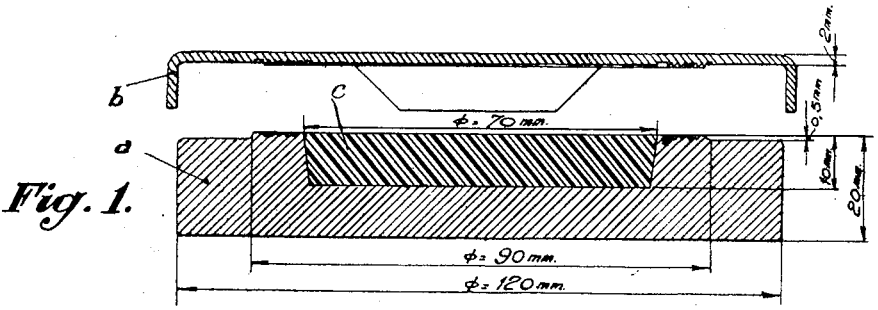
Fig. 1 shows the mold proper in vertical sectional view, *a* designating the steel mold body, *b* the sheet aluminum cover thereof, and *c* the mix.
Figure 2:
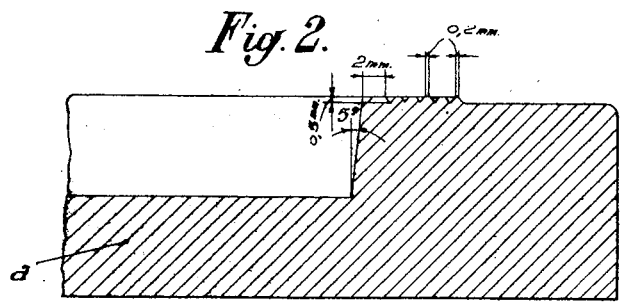
Fig. 2 is a fractional section of the mold in which the grooves and the taper of the recess are shown in detail.
Figure 6:
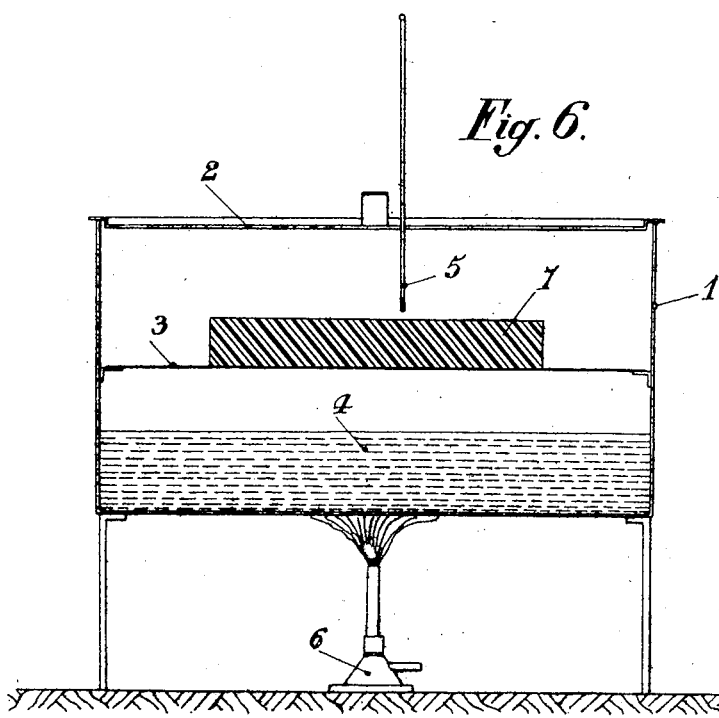

Said cellular blank is then placed in a container such as illustrated in Fig. 6 of the appended drawing in which:

I designates a cylindrical sheet steel container having a diameter of 545 mm. and a height of 290 mm. mounted on four legs about 250 mm. in height;

2 designates the sheet steel cover of the container which is provided with a handle;

3 denotes a wire gauze stretched on an angle iron ring at about 140 mm. above the bottom of the container;

4 indicates an 80 mm. deep layer of water covering the bottom of the container;

5 designates a mercury thermometer designed to ascertain the temperature at which the treatment is effected. Said thermometer projects through the cover of the container at about 30 mm. of its centre, and the lower end of it stands at about 200 mm. from the bottom of the container;

6 is an adjustable gas burner, and 7 the cellular blank in position for its treatment.

In the above-stated conditions the cellular blank is kept within the container for 100 minutes at a temperature of 90° C. indicated by the thermometer. The product is allowed to cool down to normal temperature in a normal atmosphere at normal pressure and to rest for 24 hours.

Said product is the final cellular body the volume of which, owing to the gas developed within the same during the steaming, is larger than that of the cellular blank, which means that its specific weight is lower.

*Example 2.*—By starting from a homogeneous mix having the following composition by weight: 95 parts of polyvinyl chloride with a molecular weight of about 500,000; 5 parts of tricresyl phosphate; 22.5 parts of azo-isobutyric acid dinitrile; 50 parts of phthalic acid anhydride and 10 parts of calcium carbonate (all the solid constituents being comminuted to colloidal fineness) a cellular product is manufactured in known manner by the method and with the equipment described in their principles in the French Patent No. 940,847 by working as follows:

As the starting material, a 150 grs. tablet is used which was prepared from the aforesaid powder and which is tightly boxed into the square recess of a steel mold designed generally as shown in Fig. 4 of the aforementioned patent and similarly provided with packing grooves except it is square instead of round; the recess is 90 x 90 x 15 mm. in size and the tablet emerges therefrom an amount of 1.5 mm. The mold is covered with a 1 mm. thick aluminum plate and the whole then set in a hydraulic press the pressure of which is so adjusted and regulated that the mold is subjected to a pressure of 49 tons. The mold is heated there for 20 minutes at a temperature of 185° C. after which it is allowed to cool together with its contents down to surrounding temperature.

The press is opened, the solid blank stripped and then heated for 30 minutes at a temperature of 126° C. in an agitated atmosphere.

The density of the cellular blank thus obtained is about 0.06 gr./c. cm.

Said cellular blank is then treated complementarily by the method according to my invention in order to initiate the acid-generating reactions.

It is subjected for 240 minutes to the action of a steam-saturated atmosphere at a constant temperature of 85° C., whereafter it is allowed to cool off and rest.

The specific weight of the cellular body thus obtained is then about 0.04 gr./c. cm.

*Example 3.*—A cellular body can be obtained in a similar way, by the same method and with the same equipment, except for the introduction of the following modifications:

The starting mix used contains by weight 90 parts of polyvinyl chloride, 10 parts of tricresyl phosphate, 22.5 parts of azo-isobutyric acid dinitrile, 40 parts of phthalic acid anhydride and 20 parts of barium peroxide.

The tablet emerges from the recess in the mold an amount of 0.8 mm. The heating in the press is carried out for 20 min. at a temperature of 180° C. The subsequent heating is carried out for 25 min. at a temperature of 120° C. The resulting cellular blank has a specific weight of about 0.65 gr./c. cm.

Said cellular blank is exposed for 255 minutes to the action of a steam-saturated atmosphere at normal pressure and maintained constantly at a temperature of 80° C., the resulting cellular body thereafter being allowed to cool and rest.

Its ultimate specific weight is about 0.045 gr./c. cm.

What I claim is:

1. In the formation of gas-expanded cellular materials essentially consisting of polyvinyl chloride and tricresyl phosphate, the method of generating gas within the material which comprises incorporating in the initial material at least one member of the group consisting of maleic anhydride and phthalic anhydride, and at least one member of the group consisting of calcium carbonate and barium peroxide, heating said material and applying water vapor thereto, whereby said anyhydride is converted into the corresponding acid and said acid reacts with said member of said group consisting of calcium carbonate and barium peroxide to generate gas within said material.

2. In the formation of gas-expanded cellular materials the steps which comprise intimately mixing polyvinyl chloride, tricresyl phosphate, azo-isobutyric acid dinitrile, a member of the group consisting of phthalic and maleic anhydrides, and a member of the group consisting of calcium carbonate and barium peroxide, compressing said mixture in a mold, heating said mold in a hydraulic press at a temperature of from 170° to 185° C. for from 5 to 20 minutes, cooling and demolding said mixture, heating the resulting mass in air at about 120° C. for from 20 to 30 minutes, and further heating said mass over a water bath for several hours.

PASCAL J. CARPENTIER.

REFERENCES CITED

The following references are of record in the file of this patent:

UNITED STATES PATENTS

| Number | Name | Date |
|---|---|---|
| 1,369,626 | Cuttitta | Feb. 22, 1921 |
| 1,371,016 | Bennett et al. | Mar. 8, 1921 |
| 2,386,995 | Wigal | Oct. 16, 1945 |
| 2,461,761 | Nye | Feb. 15, 1949 |